US012242124B2

(12) United States Patent
Varkey et al.

(10) Patent No.: US 12,242,124 B2
(45) Date of Patent: Mar. 4, 2025

(54) MECHANICALLY RESPONSIVE FIBER OPTIC THREAD ASSEMBLY

(71) Applicant: Schlumberger Technology Corporation, Sugar Land, TX (US)

(72) Inventors: Joseph Varkey, Richmond, TX (US); David Kim, Katy, TX (US); Maria Grisanti, Missouri City, TX (US); Tam Tran, Sugar Land, TX (US); Burcu Unal Altintas, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 352 days.

(21) Appl. No.: 17/621,144

(22) PCT Filed: Jun. 29, 2020

(86) PCT No.: PCT/US2020/040123
§ 371 (c)(1),
(2) Date: Dec. 20, 2021

(87) PCT Pub. No.: WO2020/264498
PCT Pub. Date: Dec. 30, 2020

(65) Prior Publication Data
US 2022/0349262 A1 Nov. 3, 2022

Related U.S. Application Data

(60) Provisional application No. 62/868,139, filed on Jun. 28, 2019.

(51) Int. Cl.
*E21B 17/00* (2006.01)
*E21B 47/12* (2012.01)
(Continued)

(52) U.S. Cl.
CPC .......... *G02B 6/4415* (2013.01); *E21B 17/003* (2013.01); *E21B 47/12* (2013.01);
(Continued)

(58) Field of Classification Search
CPC .... G01B 11/16; G01K 11/32; G01K 11/3206; G01K 11/3213; G01K 11/322;
(Continued)

(56) References Cited

U.S. PATENT DOCUMENTS 4,696,542 A  9/1987  Thompson
4,767,182 A * 8/1988  Parfree .............. G02B 6/44382
                                                        385/107
(Continued)

FOREIGN PATENT DOCUMENTS

CN  101726814 A   6/2010
CN  101876733 A  11/2010
(Continued)

OTHER PUBLICATIONS

Exam Report issued in United Kingdom Patent Application No. GB2118164.9 dated Oct. 27, 2022, 2 pages.
(Continued)

*Primary Examiner* — Michelle R Connelly
*Assistant Examiner* — Kirsten D. Endresen
(74) *Attorney, Agent, or Firm* — Jeffrey D. Frantz

(57) ABSTRACT

A fiber optic thread assembly configured with a cumulative gap for mechanical responsiveness and protection from micro-bend damage. The assembly may be incorporated into a wireline or slickline cable for obtaining fiber optic readings of enhanced accuracy during an application in a well. The gap is uniquely tailored to allow for a natural reduction during deployment of the cable into the well, thereby providing the enhanced accuracy. However, the gap is also sufficient to help avoid micro-bend damage from the result-
(Continued)

ing mechanical responsiveness, which is attained upon deployment of the cable into the well.

10 Claims, 6 Drawing Sheets

(51) Int. Cl.
*G01B 11/16* (2006.01)
*G02B 6/44* (2006.01)
(52) U.S. Cl.
CPC .............. *G01B 11/16* (2013.01); *G02B 6/443* (2013.01); *G02B 6/4433* (2013.01); *G02B 6/4435* (2013.01)
(58) Field of Classification Search
CPC ....... G01K 11/324; G01L 1/242; G01L 1/243; G01L 1/245; G01L 1/246; G01L 1/247; G01L 1/248; E21B 17/003; E21B 47/06; E21B 47/07
See application file for complete search history.

(56) References Cited

U.S. PATENT DOCUMENTS

| | | | |
|---|---|---|---|
| 4,920,738 A | 5/1990 | White et al. | |
| 5,495,547 A | 2/1996 | Rafie et al. | |
| 5,751,879 A | 5/1998 | Graham et al. | |
| 6,060,662 A | 5/2000 | Rafie et al. | |
| 6,334,015 B2 | 12/2001 | Jamet | |
| 6,389,204 B1 | 5/2002 | Hurley | |
| 6,392,151 B1 | 5/2002 | Rafie et al. | |
| 6,600,108 B1 | 7/2003 | Mydur et al. | |
| 6,775,444 B1 | 8/2004 | Hurley | |
| 7,699,114 B2 | 4/2010 | Ullah et al. | |
| 7,793,409 B2 | 9/2010 | Varkey | |
| 8,218,925 B2 | 7/2012 | Bohler et al. | |
| 8,886,000 B2 | 11/2014 | Register, III et al. | |
| 8,929,702 B2 | 1/2015 | Varkey et al. | |
| 8,960,271 B2 | 2/2015 | Lahijani | |
| 9,024,189 B2 | 5/2015 | Basak et al. | |
| 9,058,921 B2 | 6/2015 | Congdon et al. | |
| 9,069,148 B2 | 6/2015 | Herbst | |
| 9,091,154 B2 | 7/2015 | Weerasinghe et al. | |
| 9,182,303 B2 * | 11/2015 | Lowell | G01L 1/242 |
| 9,188,756 B2 | 11/2015 | Register, III et al. | |
| 9,335,503 B2 | 5/2016 | Kachmar | |
| 9,412,502 B2 | 8/2016 | Magner | |
| 9,691,523 B2 | 6/2017 | Pourladian et al. | |
| 10,001,613 B2 | 6/2018 | Varkey et al. | |
| 10,049,789 B2 | 8/2018 | Varkey et al. | |
| 10,215,939 B1 | 2/2019 | Varkey et al. | |
| 10,268,015 B2 | 4/2019 | Sato et al. | |
| 10,593,444 B2 | 3/2020 | Schwartz et al. | |
| 10,612,947 B2 | 4/2020 | Kishida et al. | |
| 2006/0018611 A1 | 1/2006 | Maida | |
| 2006/0045442 A1 | 3/2006 | Varkey et al. | |
| 2006/0237218 A1 | 4/2006 | Glew | |
| 2006/0104579 A1 | 5/2006 | Fitz | |
| 2006/0237217 A1 | 10/2006 | Glew | |
| 2007/0196557 A1 | 8/2007 | Weissman et al. | |
| 2008/0118209 A1 | 5/2008 | Varkey et al. | |
| 2008/0247718 A1 * | 10/2008 | Dowd | E21B 17/206 |
| | | | 385/113 |
| 2009/0034920 A1 * | 2/2009 | Dowd | G02B 6/4471 |
| | | | 65/412 |
| 2009/0046986 A1 | 2/2009 | Maeda et al. | |
| 2011/0075979 A1 | 3/2011 | Ma et al. | |
| 2011/0232936 A1 | 9/2011 | Magner | |
| 2012/0125596 A1 | 5/2012 | Homa et al. | |
| 2013/0227837 A1 * | 9/2013 | Varkey | G02B 6/4488 |
| | | | 29/525.01 |
| 2016/0025945 A1 * | 1/2016 | Wanjau | H01B 7/046 |
| | | | 166/250.1 |
| 2016/0222736 A1 | 8/2016 | Varkey | |
| 2017/0358385 A1 * | 12/2017 | Varkey | H01B 7/0275 |
| 2018/0073310 A1 | 3/2018 | Varkey | |
| 2018/0252884 A1 | 9/2018 | Quinn et al. | |
| 2019/0170955 A1 | 6/2019 | Varkey et al. | |
| 2020/0126691 A1 | 4/2020 | Varkey | |
| 2021/0055475 A1 | 2/2021 | Varkey et al. | |

FOREIGN PATENT DOCUMENTS

| | | |
|---|---|---|
| CN | 103620465 A | 3/2014 |
| CN | 106537210 A | 3/2017 |
| CN | 106716209 A | 5/2017 |
| CN | 208444062 U | 1/2019 |
| CN | 208767077 U | 4/2019 |
| EP | 0996014 A1 | 4/2000 |
| JP | H0195834 A | 4/1989 |
| JP | H08508829 A | 9/1996 |
| KR | 20120026938 A | 3/2012 |
| WO | 2008132637 A1 | 11/2008 |
| WO | 2020264494 A1 | 12/2020 |
| WO | 2020264498 A1 | 12/2020 |

OTHER PUBLICATIONS

International Search Report and Written Opinion issued in International Patent application PCT/US2020/040118 on Oct. 15, 2020, 10 pages.
International Search Report and Written Opinion issued in International Patent application PCT/US2020/040123 on Oct. 15, 2020, 10 pages.
International Preliminary Report on Patentability issued in International Patent application PCT/US2020/040118, dated Jan. 6, 2022, 7 pages.
International Preliminary Report on Patentability issued in International Patent application PCT/US2020/040123, dated Jan. 6, 2022, 7 pages.
Office Action issued in U.S. Appl. No. 17/621,094 dated May 15, 2023, 10 pages.
Office Action issued in U.S. Appl. No. 17/621,094 dated Nov. 9, 2023, 11 pages.
Office Action issued in U.S. Appl. No. 17/621,094 dated Jan. 27, 2023, 10 pages.
JPH0195834A English translation (Year: 1989).
First Office Action issued in China Patent Application No. 2020800460615 dated Jan. 4, 2024, 20 pages with English translation.

* cited by examiner

MECHANICALLY RESPONSIVE FIBER OPTIC THREAD ASSEMBLY

PRIORITY CLAIM/CROSS REFERENCE TO RELATED APPLICATION(S)

This application is a National Stage Entry of International Patent Application No. PCT/US2020/040123, filed on Jun. 29, 2020, which claims priority to U.S. Provisional Application No. 62/868,139, entitled "Optical Fiber Conveyance Line Architecture and Manufacturing Techniques," filed on Jun. 28, 2019, and incorporated herein by reference in its entirety.

BACKGROUND

Exploring, drilling and completing hydrocarbon and other wells are generally complicated, time consuming, and ultimately very expensive endeavors. In recognition of these expenses, added emphasis has been placed on efficiencies associated with well completions and maintenance over the life of the well. So, for example, enhancing efficiencies in terms of logging, perforating or any number of interventional applications may be of significant benefit, particularly as well complexity and depth continue to increase, often exceeding 30,000 feet.

One manner of conveying downhole tools into the well for the sake of logging, perforating, or a variety of other interventional applications is to use wireline or slickline cables. Wireline cables often have telemetry and power supply capabilities whereas slickline cables may be lower in profile and of limited functionality. More specifically, slickline cables may provide no more than a structural conveyance for dropping a tool or toolstring vertically into the well.

With an increased focus on efficiency, however, wireline and slickline cables may be provided with fiber optic capability. In this way, a slickline cable may be outfitted with real-time telemetric capability. Further, for both wireline and slickline cables, the addition of a fiber optic thread facilitates location specific temperature and pressure or strain measurements through conventional distributed strain and temperature (DST) techniques. This way, a degree of real-time intelligence and potential responsiveness may be provided through the conveyance. That is, a manner of controlling the tool from oilfield surface equipment is available as is real-time communications between the tool and the surface equipment.

Traditional methods of incorporating one or more fiber optic threads into a wireline or slickline cable, generally involve loose placement of the threads into the surrounding architecture of the line. For example, the fiber optic portion of the assembly is often referred to as the FIMT (fiber(s) in metal tube(s)). From a manufacturability standpoint, such packaging is practical. Additionally, allowing the fiber optics within the tube to float or migrate over the course of an application may help to prevent stress induced damage to the fibers as a result of mechanical bending and torque from the surrounding tube.

Unfortunately, placing the fiber optics loosely within the metal tube sacrifices precision in terms of the acquired data from the fiber optics. For example, because the fiber optic thread may be a notable distance from the structure of the tube, a bend in the tube may not translate into an immediately detectable or identical bend in the fiber optic thread. Similarly, leaving airspace between the thread and tube means that temperatures that the tube are exposed to at a given downhole location may not readily be translated to the fiber optic thread. By the same token, at any given location of the cable, the thread may randomly be in close physical communication with the tube at a given moment in time. At such times and locations, the stress or temperature detection via the thread may actually be fairly accurate. Of course, the operator and/or surface equipment have no way of deciphering such moments of relative improved accuracy versus any other moment. As a result, this fact only serves to complicate matters.

Of course, the possibility of eliminating the looseness and treating the fiber optic thread as any other cable component is available. For example, a jacketed thread could be structurally located right against the metal tube or some other jacket structure. In theory, using such architecture would improve the accuracy of the data obtained from the thread. Unfortunately, this theory fails as the surrounding structure tends to induce micro-bend fractures in the fiber optic thread. This is particularly the case where the cable depth into the well is of considerable length. In such cases, a resulting stretching of the surrounding structure would place a squeeze on the thread, thereby inducing such damage even in the absence of any undue bending. As a result, operators are generally left relying on imprecise fiber optics rather than employing a single use fiber optic cable that is prone to fail.

SUMMARY

A wireline cable is provided with a fiber optic thread. The thread is incorporated into a package thereabout. This incorporation is such that the thread is mechanically responsive to the package during an application employing the cable. However, a cumulative gap total of at least about 0.002 inches is provided between the thread and the package.

DETAILED DESCRIPTION

Embodiments are described with reference to certain cables and downhole applications. Specifically, the depicted embodiments herein focus on wireline or slickline applications such as performing a logging application in a well. However, alternate applications employing such cables may take advantage of the unique characteristics detailed herein. As used herein, the term "slickline" is meant to refer to an application that is run over a conveyance line that is substantially below 0.25-0.5 inches in overall outer diameter, whereas wireline applications may use slightly larger profile cables. Regardless, so long as a cable is provided with a fiber optic thread that includes a cumulative gap total of at least about 0.002 inches which translates to mechanical responsiveness during an application, appreciable benefit may be realized.

Figure 1B:
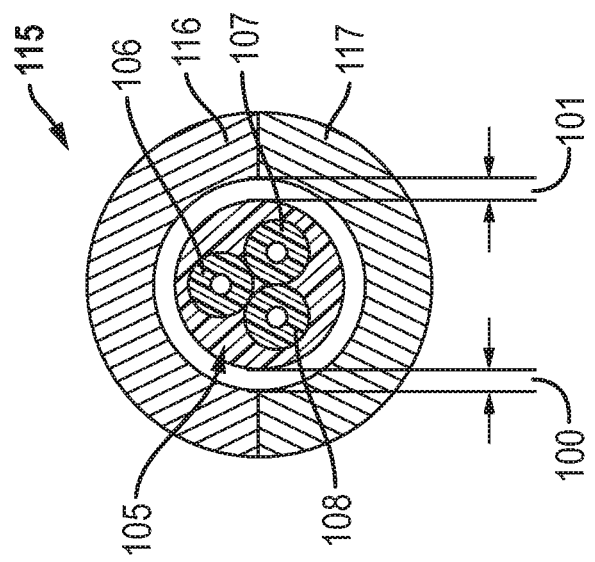
FIG. 1B is an enlarged cross-sectional view of the mechanically responsive fiber optic thread assembly.
Figure 1A:
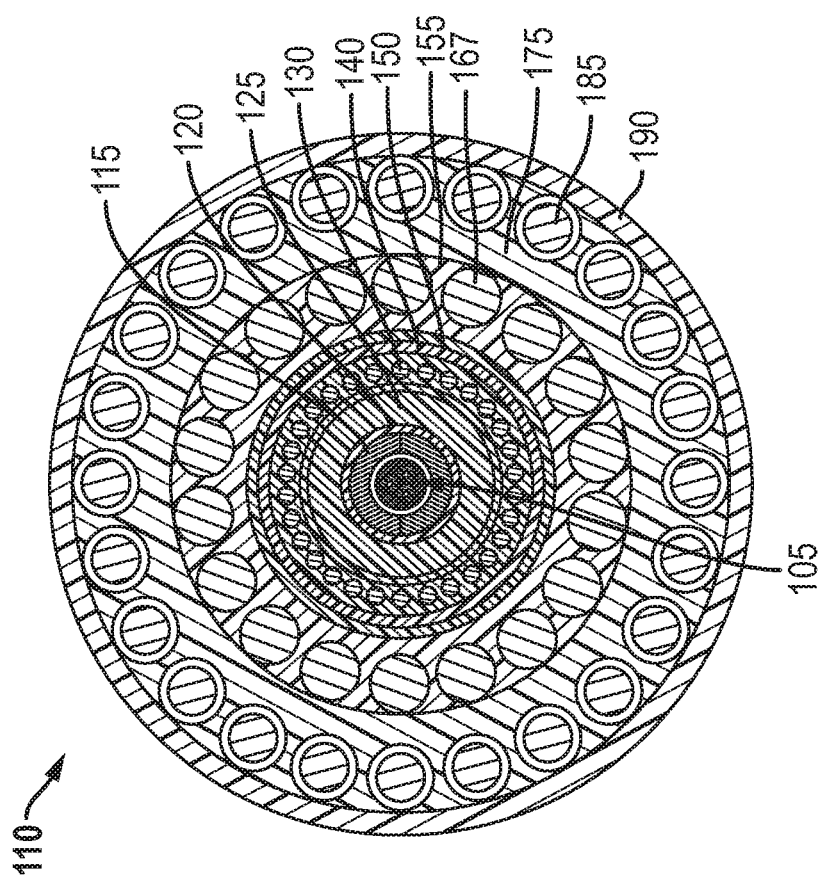
FIG. 1A is a front cross-sectional view of the cable of FIG. 2 with a mechanically responsive fiber optic thread assembly therein.
Figure 2:
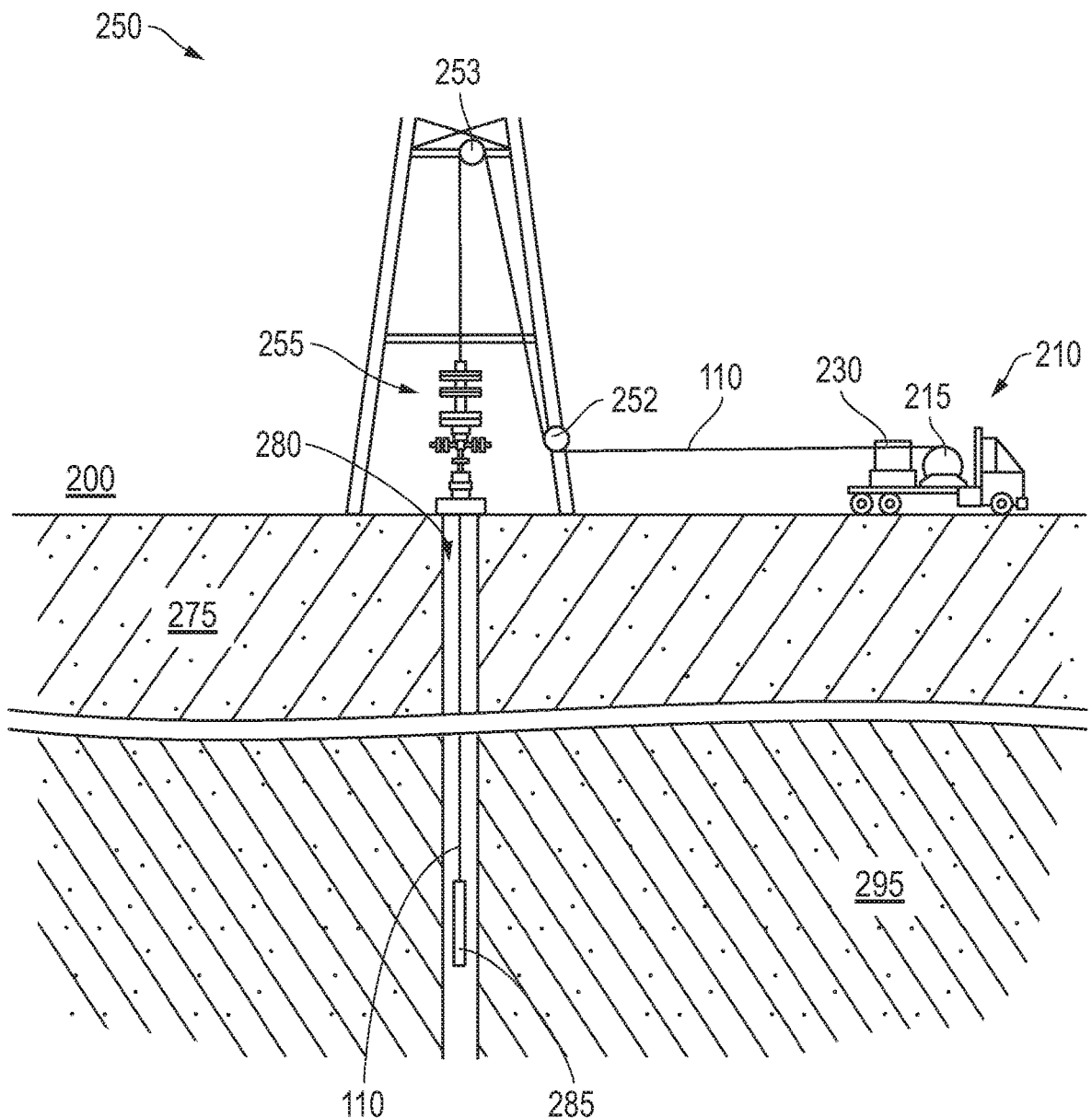
FIG. 2 is an overview of an oilfield where a cable employing a mechanically responsive fiber optic thread assembly therein is deployed in an oilfield application.

Referring specifically now to FIG. 1A, a front cross-sectional view of the cable 110 of FIG. 2 is shown with a mechanically responsive fiber optic thread assembly 115 therein. More specifically, with added reference to FIG. 1B, the cable 110 and assembly 115 are shown in cross-section prior to deployment in an oilfield application such as the logging application illustrated in FIG. 2. Thus, at this time, the wound cable 110 remains under no deployment load. As a result, close inspection of the fiber optic thread assembly 115 reveals a degree of gap 100, 101 between the jacketed threading 105 and adjacent conductors or metal tubular (116, 117), e.g., metal tube or tubing. In the embodiment shown, the metal tubular within which the threading 105 is disposed is provided in the form of semicircular conductors or metal tubulars 116, 117.

Unlike conventional FIMT construction, the fiber optic thread assembly 115 is configured to ensure that the jacketed threading 105 is mechanically responsive to the conditions that the conductors or metal tubulars 116, 117 are exposed to during the application illustrated in FIG. 2. Indeed, the same goes for the remaining structure of the cable 110 such as insulating layers (e.g., outer polymer), layers 120, 140, other conductors 130, strength members 167, 185 and so forth. That is, all this structure is physically coupled together in an assembly without any measurable gap such as the gap 100, 101 of the interior assembly. Further, as detailed below, even though the gap 100, 101 is present at the assembly 115 as illustrated in FIGS. 1A and 1B, it is substantially eliminated upon application as illustrated in FIG. 2. Therefore, the characteristic of mechanical responsiveness is provided to the jacketed threading 105 during such an application.

Continuing with specific reference to FIG. 1A, the example cable 110 is otherwise of standard construction with insulating layers 120, 125, 140, 150, 155, 175, conductors 130, strength members 167, 185 and an outer jacket 190. With specific reference to FIG. 1B, the fiber optic thread assembly 115 that is at the core of the cable 110 is enlarged and illustrated in greater detail. In this view, the cumulative gap 100, 101 between the jacketed threading 105 is readily apparent. It is illustrated as a "cumulative gap" 100, 101 with space at both sides of the threading 105, which is centrally located. Of course, upon construction, the threading 105 may be located in a non-central manner or even entirely to one side of the interior of the assembly 115 such that only one gap 100 or 101 is present. For this reason, the term "cumulative gap" is used to mean that the total space between the threading 105 and the interior of the conductors or metal tubulars (e.g., 116, 117) as measured along any axial diameter through the center of the threading 105 and continuing to the adjacent tubing.

In the embodiment shown, the cumulative gap 100, 101 is between about 0.002 inches and about 0.004 inches. That is, in theory, eliminating the gap altogether might provide mechanical responsiveness to the threading 105 for an application as illustrated in FIG. 2. However, this would also present stress to the threading 105 as the weight of the cable 110 would tend to subject load on surrounding structure from the suspending of the cable in the well 280 as illustrated in FIG. 2. Thus, rather than allowing the cable 110 to squeeze the conductors or metal tubulars (116, 117) with direct impact on a gap-free threading 105, a cumulative gap 100, 101 is intentionally built into the architecture of the cable 110. In this way, as the application of FIG. 2 progresses, the load presented results in a compression on the conductors or metal tubulars 116, 117 sufficient to minimize the gap 100, 101 and provide the mechanical responsiveness without placing undue stress on the threading 105. Therefore, the likelihood of microfractures to the individual fiber optic threads 106, 107, 108 may be substantially avoided even though the mechanical responsiveness has been provided. It is worth noting that while the embodiment of FIGS. 1A and 1B reveal a helically wound triad of jacketed fiber optic threads (106, 107, 108) for the thread assembly 115, other fiber optic configurations, including single fiber configurations may be employed as detailed further herein.

Referring now to FIG. 2, an overview of an oilfield 200 is illustrated where the cable 110 of FIG. 1A is used with a mechanically responsive fiber optic thread assembly 115 therein (see e.g., FIG. 1B). Notably, as suggested above, it is the use of the cable 110 in the illustrated oilfield application which provides the mechanical responsive character to the internal fiber optic thread assembly 115. Specifically, in this view, the load of the cable's own weight as it is suspended is readily understood. For example, with added reference to FIG. 1A, the large degree of polymeric internal structure of the cable 110 would result in a stretching during the suspension that would tend to compress toward and/or against the assembly 115.

Continuing with reference to FIG. 2, the cable 110 is specifically suspended within a well 280 to deploy a logging tool 285 for a logging application. In this way, well characteristic information may be acquired as the tool 285 traverses various formation layers 275, 295. Thus, the logging application and tool 285 may benefit from the capacity for telemetry over the fiber optics of the cable 110. For example, as shown in FIG. 2, the oilfield 200 is outfitted with a host of surface equipment 250 such as a truck 210 for sake of mobile cable delivery from a drum 215. However, in the embodiment shown, the truck 210 also accommodates a control unit 230 which may house a processor and power means for interfacing with the downhole logging tool 285. Thus, rather than run a logging application with a tool limited to a downhole battery and recorder for later analysis, an application may be run in which the tool 285 is provided with sufficient power and data therefrom is acquired by the control unit 230 in real-time.

To effectively run such a real-time downhole application as described above, the cable 110 is of a unique architecture that enhances accuracy of fiber optic readings obtained without undue stress being placed on the fiber optic components. Specifically, as noted above, employing an architecture with a cumulative gap 100, 101 in the cable 110 that is between about 0.002 inches and about 0.004 inches ultimately provides a mechanically responsive fiber optic architecture during the application for the reasons noted above (see FIG. 1B).

With continued added reference to FIGS. 1A and 1B, the term "mechanically responsive" is used to highlight the substantial reduction or elimination of the cumulative gap 100, 101 during the application. That is, the surrounding structure squeezes about the conductors or metal tubulars 116, 117 and ultimately toward the threading 105. So, for example, fiber optic detection of mechanical cable bending may be ascertained with a greater degree of accuracy. However, it is also worth noting that with the mechanical reduction or elimination of the gap 100, 101 during the application, mechanical responsiveness is not the only fiber optic detection that is enhanced. Indeed, pressure, temperature or any detections ascertainable from the fiber optic components are also enhanced. For example, consider how the reduction or elimination of airspace in the form of the gap 100, 101 would increase fiber optic sensitivity to temperature readings from the well 280. In essence, the cable 110 is constructed in a unique manner with a gap 100, 101 to protect delicate fiber optic components, which reduces upon deployment to enhance fiber optic detections without undue harm to the components.

Figure 3A:
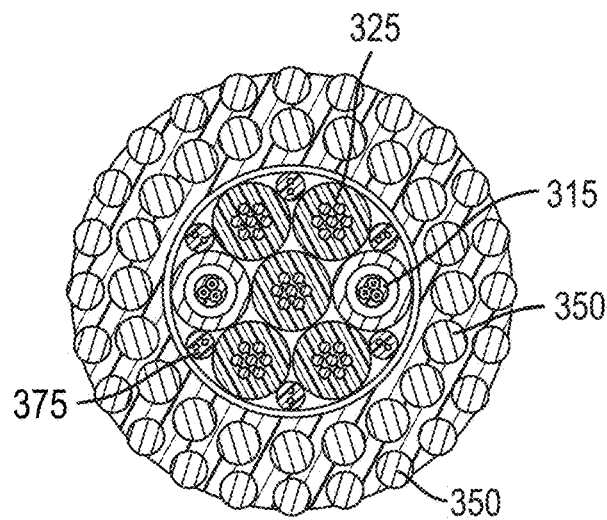
FIG. 3A is an embodiment of a cable employing the mechanically responsive fiber optic thread assembly of FIG. 1B.
Figure 3B:
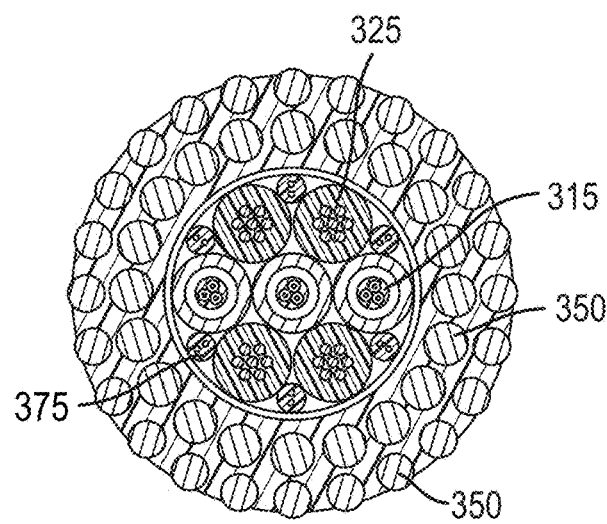
FIG. 3B is another embodiment of a cable employing the mechanically responsive fiber optic thread assembly of FIG. 1B.
Figure 3C:
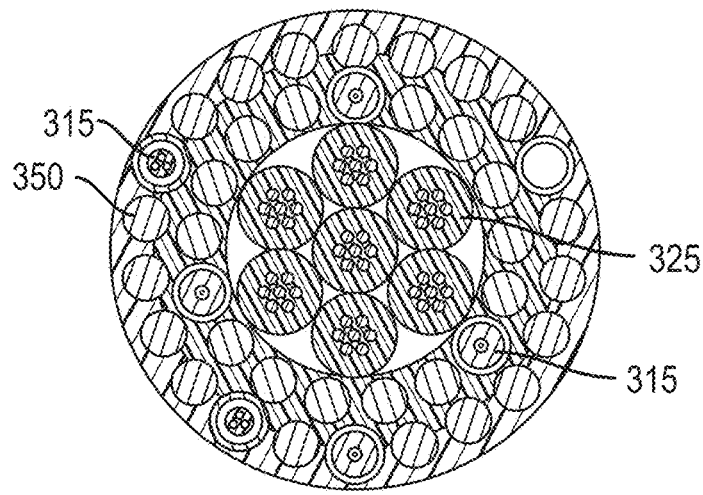
FIG. 3C is yet another embodiment of a cable employing the mechanically responsive fiber optic thread assembly of FIG. 1B.

Referring now to FIGS. 3A-3C, different cable embodiments are illustrated and each employs a mechanically responsive fiber optic thread assembly 315 similar to that of FIG. 1B. Specifically, FIG. 3A illustrates a heavily jacketed cable with multiple layers of strength members 350 embedded in polymer with a more central power conductive core (see conductor packages 325). This central core of the cable also includes interior strength member packages 375 as well as two different mechanically responsive fiber optic thread assemblies 315. Thus, in terms of fiber optics, enhanced accurate readings may be taken from two different sides of the cable. Further, for the embodiment of FIG. 3B, a third thread assembly 315 is provided right at the center of the cable. Thus, both central and side readings may be acquired for comparative analysis.

Referring now to FIG. 3C, another embodiment of a cable employing a mechanically responsive fiber optic thread assembly 315 is shown. In this embodiment, the assembly 315 is incorporated directly into strength members (e.g., 350). So, for example, instead of utilizing conductors or metal tubulars 116, 117 for the metal tube function, more conventional metal tubing is employed but with the added feature of a tailored cumulative gap 100, 101 (see FIG. 1B). In the embodiment shown, conductor packages 325 are again centrally located whereas multiple layers of strength members 350 are located more exteriorly. Thus, by incorporating mechanically responsive fiber optic thread assemblies 315 into strength member locations, more exterior readings closer to the wellbore may be acquired. Additionally, note that in this embodiment, the fiber optics may be of a helical triad variety as illustrated in FIG. 1B or of a single fiber variety as discussed below.

Figure 4:
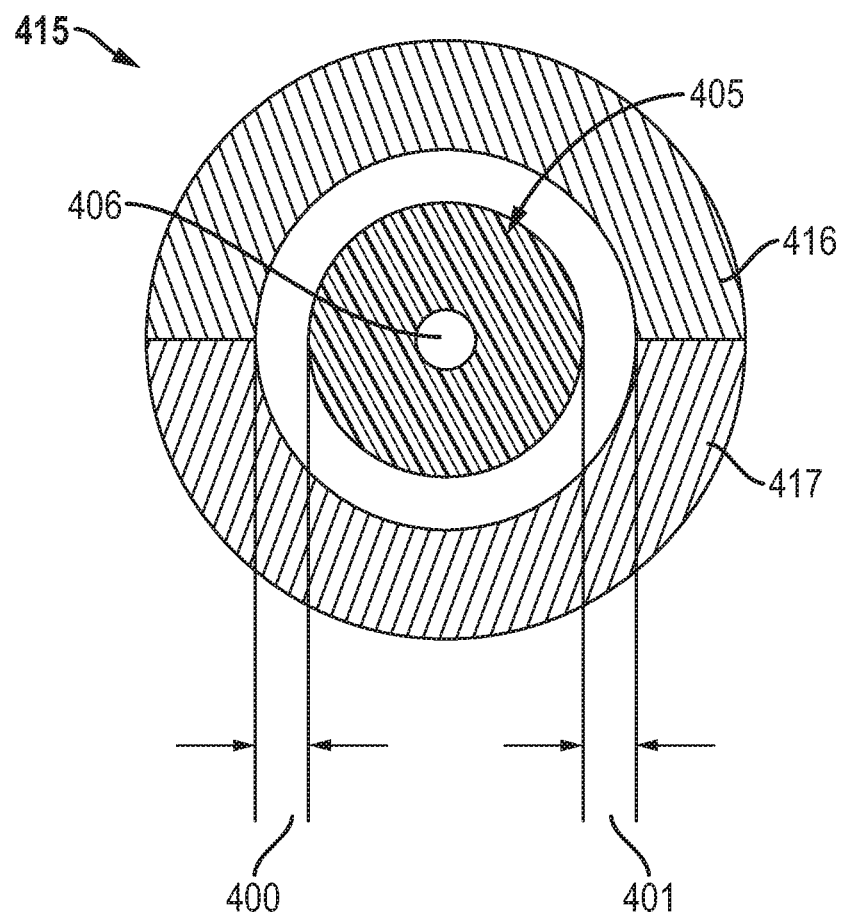
FIG. 4 is a side cross-sectional view of an alternate embodiment of a mechanically responsive fiber optic thread assembly of a single fiber variety.

Referring now to FIG. 4, a side cross-sectional view of an alternate embodiment of a mechanically responsive fiber optic thread assembly 415 is illustrated. As indicated above, the assembly of FIG. 4 is of a single fiber variety with a single fiber optic thread 406 at its core location. A jacket 405 is provided as well as metal tubing in the form of conductors 416, 417 similar to the embodiment of FIG. 1B. Notably again, to provide reliable mechanical responsiveness during an application, a tailored cumulative gap 400, 401 of between about 0.002 inches and about 0.004 inches is provided.

Figure 5A:
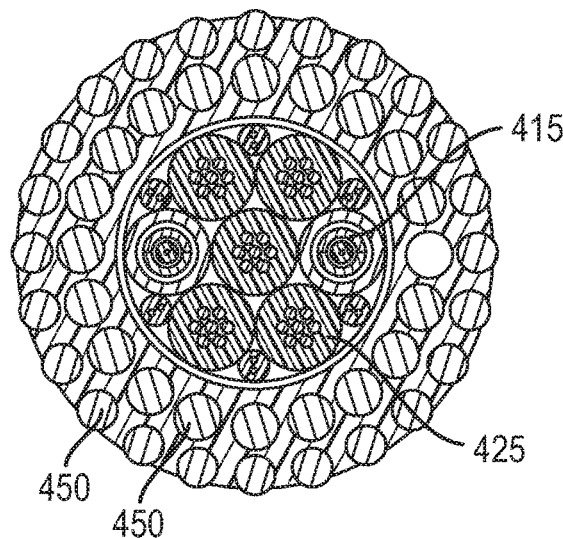
FIG. 5A is a first embodiment of a cable employing the mechanically responsive fiber optic thread assembly of FIG. 4.

Referring now to FIGS. 5A-5D different cable embodiments employing the single fiber mechanically responsive fiber optic thread assembly 415 of FIG. 4 are illustrated. Specifically, FIG. 5A illustrates a heavily jacketed embodiment with interior conductor packages 425 and exterior layers of strength members 450 similar to the embodiment of FIG. 3A. Additionally, the thread assemblies 415 are located at two different sides of the central portion of the cable so as to obtain comparative readings from different cable sides. Further, in this embodiment, the replacement of the helical fiber optic triad with the single fiber variety facilitates larger conductor sizing for each assembly 415 without altering the profile.

Figure 5B:
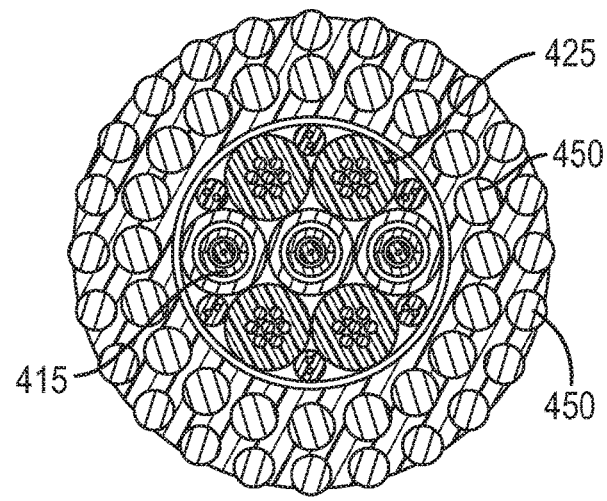
FIG. 5B is a second embodiment of a cable employing the mechanically responsive fiber optic thread assembly of FIG. 4.
Figure 5C:
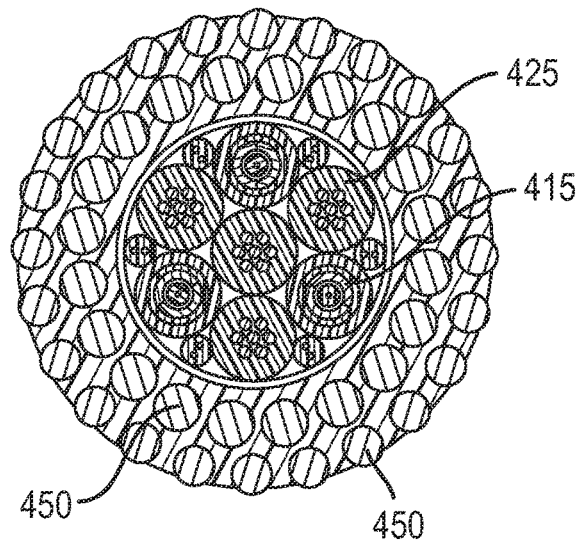
FIG. 5C is a third embodiment of a cable employing the mechanically responsive fiber optic thread assembly of FIG. 4.

FIGS. 5B and 5C illustrate embodiments similar to that of FIG. 5A but that utilize a third single fiber mechanically responsive assembly 415. So, for example, like in the embodiment of FIG. 3B, a centrally located assembly 415 may be used in addition to assemblies 415 at either side of the central cable region. Further, as illustrated in FIG. 5C, the assemblies 415 may be provided in a triad configuration. Indeed, in one embodiment, this triad of assemblies 415 may themselves be helically wound about one another throughout the length of the cable.

Figure 5D:
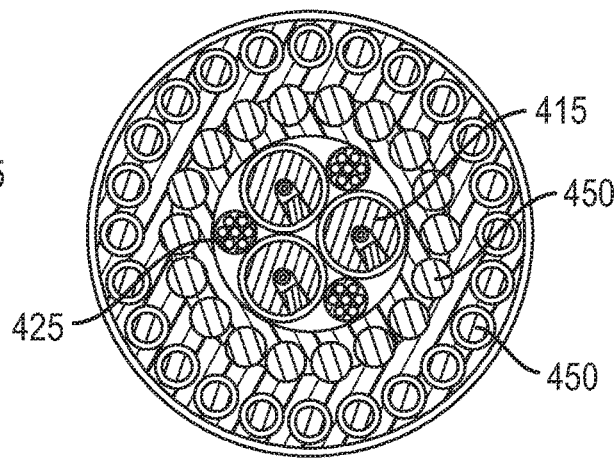
FIG. 5D is a fourth embodiment of a cable employing the mechanically responsive fiber optic thread assembly of FIG. 4.

Referring now to FIG. 5D, still another embodiment of a cable employing the single fiber, mechanically responsive fiber optic thread assembly 415 of FIG. 4 is illustrated. In this embodiment, another triad of assemblies 415 is supplied at a central location with conductor packages 425 and more exterior layers of strength members 450. In this embodiment, the conductors of the assemblies are of a non-uniform variety. That is, rather than the more common, crescent, evenly sized interfacing conductors or metal tubulars 116, 117 of FIG. 1B, a variety of conductor morphologies may be employed. Again, so long as the cumulative gap 400, 401 is in the range of 0.002 inches to 0.004 inches, a mechanical responsiveness of the fiber optics may be acquired during the application without undue risk of fiber optic microfracture.

Figure 6:
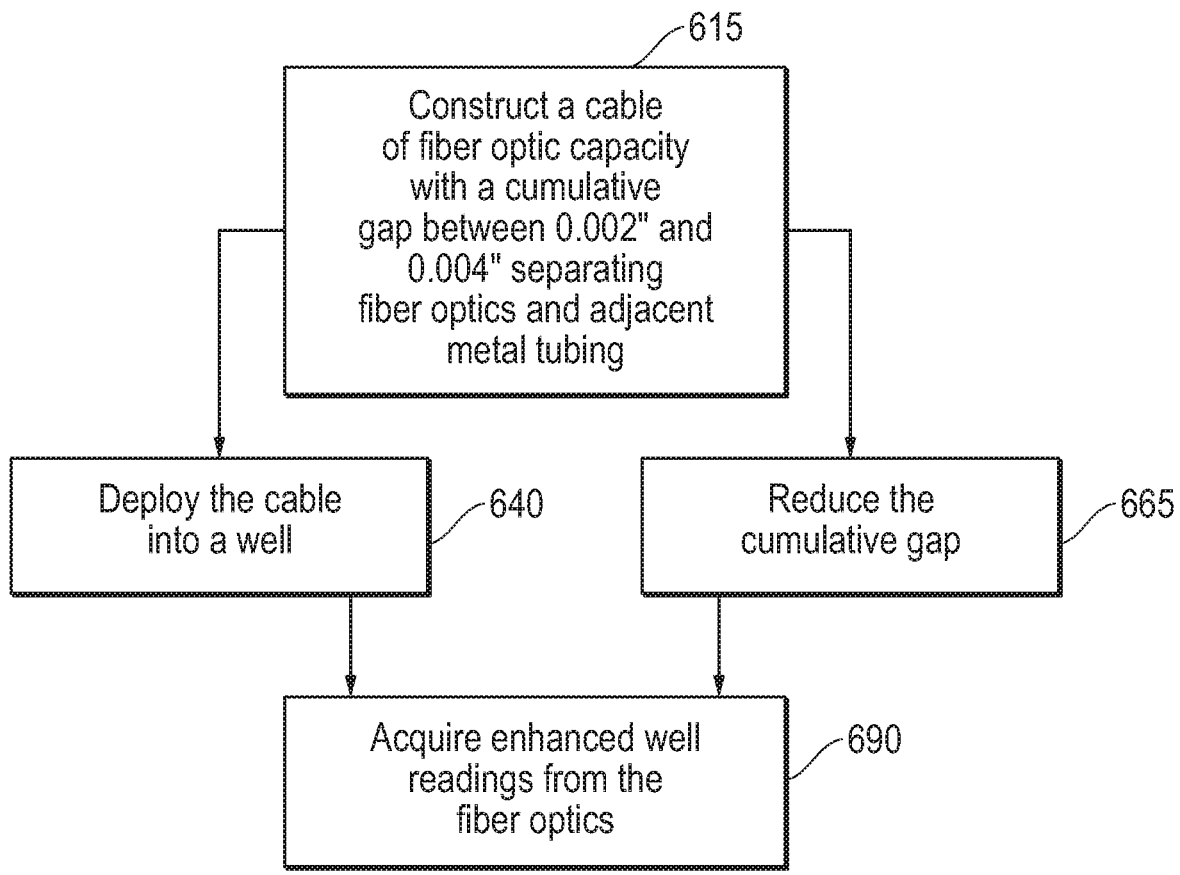
FIG. 6 is a flowchart summarizing an embodiment of employing a mechanically responsive fiber optic thread assembly in an application at an oilfield.

Referring now to FIG. 6 is a flowchart summarizing an embodiment of employing a mechanically responsive fiber optic thread assembly in an application at an oilfield. Namely, as indicated at 615, a slickline or wireline cable is constructed having fiber optic capacity and a cumulative gap between about 0.002 and about 0.004 inches separating the fiber optics and adjacent metal tubing. Thus, as the cable is deployed into a well as indicated at 640, the cumulative gap may naturally reduce due to the load of the surrounding cable structure (see 665). In this way, a mechanically responsive character may be supplied to the fiber optics for enhanced reading accuracy as noted at 690.

Embodiments detailed hereinabove utilize the concept of spacing or a gap between metal tubing and fiber optics for safeguarding of the fiber optics in a cable, for example, during storage and transport. Furthermore, this spacing is tailored to a unique size such that upon use of the cable, by suspension in a well, the spacing is reduced or eliminated so as to provide a mechanical responsiveness to the fiber optics for enhancement of fiber optic readings. Once more, the spacing is also tailored to substantially avoid micro-bend damage to the fiber optics from stress of contact being applied by the squeezed metal tube architecture. As a result, readings from the fiber optics are of improved accuracy without undue risk of damage to the fiber optics.

The preceding description has been presented with reference to presently preferred embodiments. Persons skilled in the art and technology to which these embodiments pertain will appreciate that alterations and changes in the described structures and methods of operation may be practiced without meaningfully departing from the principle and scope of these embodiments. Regardless, the foregoing description should not be read as pertaining only to the precise structures described and shown in the accompanying drawings, but rather should be read as consistent with and as support for the following claims, which are to have their fullest and fairest scope.

What is claimed is:

1. A mechanically responsive fiber optic thread assembly for incorporation into a cable for use in a well, the fiber optic thread assembly comprising:
    fiber optic threading; and
    a plurality of tubulars about the fiber optic threading, wherein an innermost tubular of the plurality of tubulars is a metal tubular, wherein a cumulative air gap between the fiber optic threading and the metal tubular is between 0.002 inches and 0.004 inches, wherein the metal tubular comprises a conductor, the conductor comprising multiple uniform semicircular conductors to form the metal tubular.

2. The fiber optic thread assembly of claim 1 wherein the fiber optic threading includes a polymeric jacket about a fiber optic thread.

3. The fiber optic thread assembly of claim 1 wherein the fiber optic threading includes a polymeric jacket about a triad of fiber optic threads.

4. The fiber optic thread assembly of claim 3 wherein the triad is a helically wound triad.

5. A method of performing an application in a well with a fiber optic cable, the method comprising:
    obtaining the fiber optic cable, the fiber optic cable comprising:
        a fiber optic thread assembly having fiber optic threading with a plurality of tubulars thereabout, wherein an innermost tubular of the plurality of tubulars is a metal tubular, wherein a cumulative air gap constructed between the fiber optic threading and the metal tubular is between 0.002 inches and 0.004 inches, wherein the metal tubular comprises a conductor, the conductor comprising multiple uniform semicircular conductors to form the metal tubular; and
        an outer structure comprising at least one of an insulating layer, a conductor layer, a strength member layer, or a jacket about the fiber optic thread assembly, wherein the outer structure is configured to impart a load on the fiber optic thread assembly during the application to reduce the cumulative air gap for enhancing mechanical responsiveness from the fiber optic threading;
    deploying the fiber optic cable into the well for the application;
    reducing the cumulative air gap during the deploying for enhanced mechanical responsiveness from the fiber optic thread assembly;
    performing the application; and
    acquiring enhanced readings from the fiber optic threading during the performing of the application due to the reducing of the cumulative air gap.

6. The method of claim 5 wherein the reducing of the cumulative air gap is facilitated by the load of the outer structure about the metal tubular when suspended in the well by the deploying thereof.

7. The method of claim 5 wherein the reducing of the cumulative air gap includes substantially eliminating the cumulative air gap.

8. The method of claim 7 wherein the eliminating of the cumulative air gap substantially avoids inducing micro-bend damage to the fiber optic threading.

9. The method of claim 5 wherein the fiber optic cable is one of a wireline cable and a slickline cable.

10. The method of claim 9, wherein the fiber optic cable is the wireline cable to support the application with power to an application tool and real-time telemetric capacity over the fiber optic threading to surface equipment adjacent the well.

* * * * *